United States Patent [19]

Hooper et al.

[11] Patent Number: 4,594,045
[45] Date of Patent: Jun. 10, 1986

[54] HOLD DOWN AND SEALING ASSEMBLY FOR DISCHARGER MECHANISM

[75] Inventors: Anthony W. Hooper, Montreal, Canada; Alexander D. Cormack, Marietta, Ga.

[73] Assignee: Uniweld Inc., Sherbrooke, Canada

[21] Appl. No.: 621,260

[22] Filed: Jun. 15, 1984

[51] Int. Cl.$^4$ ............................................. B65G 25/04
[52] U.S. Cl. ...................................... 414/325; 198/741
[58] Field of Search ..................... 414/304, 325, 306; 198/737, 741, 747; 308/3.5; 277/33; 104/161

[56] References Cited

U.S. PATENT DOCUMENTS

| | | | |
|---|---|---|---|
| 3,802,552 | 4/1974 | Gann et al. | 198/741 |
| 3,923,149 | 12/1975 | Stearns | 198/747 |
| 4,157,761 | 6/1979 | Debor | 414/304 |

OTHER PUBLICATIONS

Brochure for Hooper SR Discharger ©1982.

Primary Examiner—Robert J. Spar
Assistant Examiner—Stuart J. Millman
Attorney, Agent, or Firm—Larson and Taylor

[57] ABSTRACT

A discharger mechanism is provided for discharging solids from the bottom of a pile. The discharger comprises a reciprocating stoker rod having a series of stoker cross bars, affixed thereto, which is supported by bearings within a trough. An arrangement for holding down the rod and for sealing the trough comprises a pair of longitudinally extending metal strips attached to either side of the rod and a pair of seal strips or plates secured to the edges of the trough and extending therefrom into the trough to positions above and adjacent to the upper surfaces of the metal strips.

9 Claims, 3 Drawing Figures

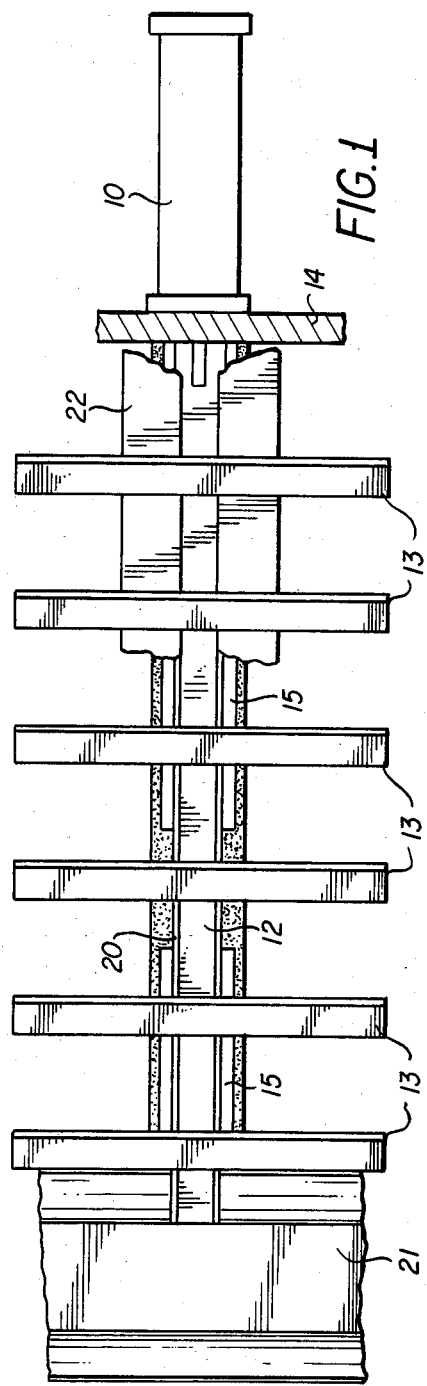
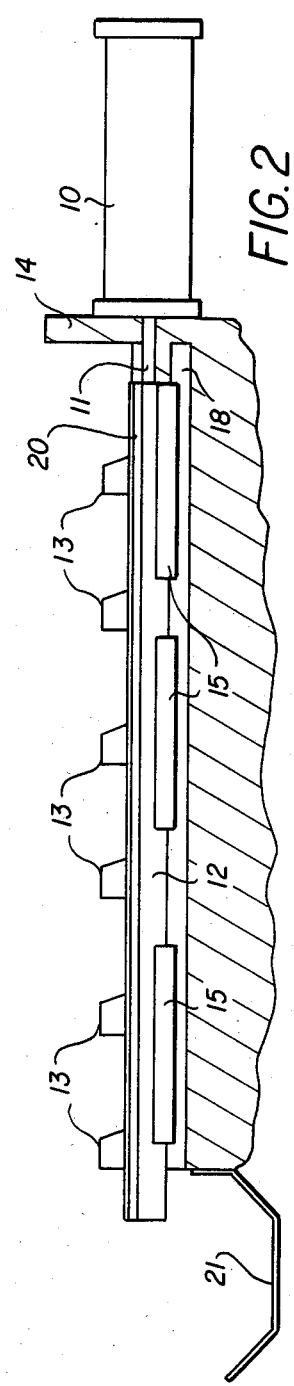

HOLD DOWN AND SEALING ASSEMBLY FOR DISCHARGER MECHANISM

FIELD OF THE INVENTION

The present invention relates to a discharger mechanism for discharging solid materials such as granular materials, pellets, chips and the like such as from the bottom of a pile or from a bin or hopper.

BACKGROUND OF THE INVENTION

Discharger mechanisms, sometimes referred to as feeder mechanisms or stoker mechanisms, are well known and U.S. Pat. No. 3,923,149 and U.S. Pat. No. 4,157,761 both disclose examples of such discharger mechanisms. A serious problem with such discharger mechanisms is that the stoker rod is subject to lifting caused by compaction of fines underneath the rod. This is particularly true of those prior art discharger mechanisms employing grease lubrication and using round stoker rods disposed in a trough or cavity. This lifting of the stoker rod eventually causes mechanical damage to the stoker mechanism through wear, thus necessitating expensive repairs or replacement. Previous discharger mechanisms designs employing round stoker rods used a seal strip with a bevelled edge which was disposed so as to come in close contact with the upper portion of the round rod, the seal strip thus serving the dual functions of preventing the rod from lifting and of impeding the flow of fines into the cavity. A significant problem with the construction described above, and with other hold down plates such as described in the aforementioned U.S. Pat. No. 3,923,149, is that the friction, and hence the wear, takes place on the rod itself and will eventually cause the rod and/or the seal (hold down) strip to fail, thereby requiring expensive replacement.

SUMMARY OF THE INVENTION

In accordance with the present invention there is provided a discharger mechanism for discharging solid materials from the underside of a pile which overcomes the disadvantages of the prior art. The overall discharger basically comprises a stoker rod extending beneath the pile, means for supporting said stoker rod within a trough, a plurality of stoker cross bars spaced along the length of the stoker rod and rigidly attached thereto, and reciprocating means for longitudinally reciprocating the stoker rod. According to the invention, means are provided for holding down the rod and for sealing the trough from the materials contained in the pile, comprising: (i) a pair of longitudinally extending hold down members attached to opposite sides of said rod and (ii) a corresponding pair of sealing members secured to the opposite sides of the trough and extending inwardly from the sides of the trough to positions above and adjacent to the upper edges of respective ones of the pair of hold down members. With this arrangement, during the operation of the discharger, the sealing members prevent said rod from lifting, and in cooperation with the hold down members, prevent entry of material from the pile into the trough. Unlike prior art designs, the means for holding down the rod and for sealing the trough does not subject the rod itself to friction and wear because any wear is wear on the hold down members. Further, this arrangement significantly decreases the flow of fines from the pile into the trough.

Other features and advantages of the invention will be set forth in, or apparent from, the detailed description of the preferred embodiments which follows.

BRIEF DESCRIPTION OF THE DRAWINGS

In the drawings, which illustrate preferred embodiments of the invention:

FIG. 1 is a top plan view of a discharger mechanism constructed in accordance with the present invention;

FIG. 2 is a side elevational view, partially in cross section, of the discharger mechanism shown in FIG. 1.

DESCRIPTION OF THE PREFERRED EMBODIMENTS

Figure 3:
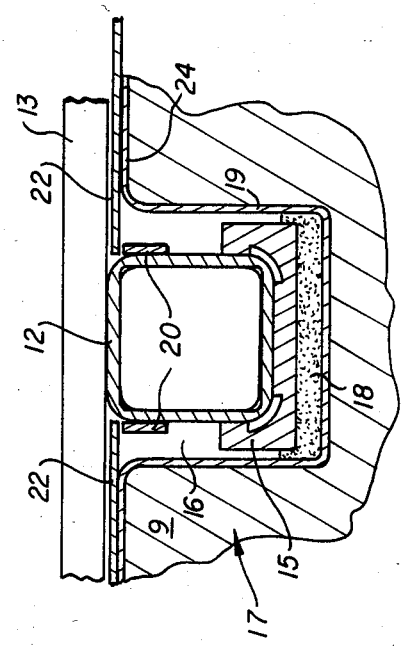
FIG. 3 is an axial cross section of the discharge mechanism shown in FIG. 1 taken generally along line 3—3.

Referring to FIGS. 1-3, a discharger mechanism is shown which includes a hydraulic cylinder 10 with a piston rod 11 connected to a stoker rod 12 and which is disposed on a portion of base 9 which is preferably substantially horizontal. In a preferred embodiment, the base 9 is the base of a bin or hopper, the base having at least one cavity or trough 16 therein in which the stoker rod 12 is mounted. A generally U-shaped support member 19 whose shape conforms to that of cavity or trough 16 is disposed within the cavity. The rod 12 may be hollow or solid. Mounted transversely of, and substantially equispaced along, stoker rod 12 are a plurality of stoker cross bars 13 which are attached to rod 12 at their midpoints. The flange of the cylinder 10 is mounted on a thrust member 14 which takes the full force from the cylinder 10 when the stoker rod 12 is being pushed or pulled. Thrust member 14 is usually anchored to a firm base. The stoker rod 12 rests on support bearings 15 disposed within cavity 16. The cross bars 13 are attached to the top portion of stoker rod 12 so that they are located just above the floor level 17 of the base 9 of the hopper or bin. The discharge mechanism illustrated is designed to discharge onto a conveyor 21.

In a preferred embodiment, the stoker rod 12 has a substantially rectangular cross section as depicted in FIG. 3, and the support bearings 15 preferably are of the type disclosed in our copending application Ser. No. 621,259, filed on even date herewith, the disclosure of which is hereby incorporated by reference. Bearing members 15 are fixed in place in cavity 16 using grout 18 and engage the bottom and sides of stoker rod 12 as shown in FIG. 3.

In accordance with a principal feature of the invention, an arrangement is provided for holding down the stoker rod 12 from lifting and for sealing the cavity 16 in which the stoker rod 12 is disposed from material (fines) contained in the pile. This arrangement comprises a pair of hold down members or bars 20 attached to and extending longitudinally along the opposite sides of rod 12, and a corresponding pair of sealing members or seal strips 22 secured to the edge of cavity 16 and extending inwardly therefrom to points above and adjacent to the upper surfaces or edges of the hold down members 20. The hold down members 20 preferably comprise metal strips or bars which are made of softer metal than sealing members 22 and which are secured to the sides of rod 12 such as by welding. Sealing members 22 preferably comprise metal strips or plates which are anchored to the outwardly extending flanges of U-shaped support member 19 by, for example, indicated at welds 24. In practice, it is greatly preferred that the hold down members 20 and sealing members 22 be continuous along the entire length of rod 12. It will be seen that members 20 and 22 function to reduce the amount of fines entering cavity 16 and as stated above, a build up of material within the cavity as a result of the reciprocating movement of the stoker rod 12 will cause the rod to lift. A discontinuous arrangement of members 20, i.e., one wherein members 20 each, would be divided into a series of discrete or intermittent sections (strips) spaced along the length of rod 12 would actually cause packing of material in the trough 16 due to a piston action that would be produced by the strips during reciprocation of rod 12.

In operation, the discharger mechanism is reciprocated and the cross bars 13 push a layer of material resting between the cross bars towards the discharge outlet. During this operation, the rod 12 has a tendency to lift and this is prevented by the engagement of the hold down bars 20 with the seal strips 22. As stated above, it is preferred that the hold down bars 20 comprise a material softer than the seal strips 22 so that the hold down bars 20 wear preferentially.

As previously noted, a particularly advantageous feature of this invention is that the rod 12 itself does not contact the seal strips 22 and hence will not wear. Further, a seal or barrier between material of the the pile and the stoker rod 12 and support therefor is formed by the cooperating hold down bars 20 and seal strips 22, thereby effectively limiting flow of fines from the pile into the cavity 16.

As is well known to those skilled in the art, the stoker floor may be equipped with fixed floor angles, the discharger mechanism may be adapted to accommodate discharge outlets positioned at either or both ends or the center relative to the stoker rod, and two or more discharger mechanisms may be adapted to operate in tandem as disclosed, for example, in U.S. Pat. No. 4,157,761.

It will be understood that various changes may be made to the embodiments shown herein without departing from the scope or spirit of the invention. For example, the hydraulic cylinder disclosed in the illustrated embodiment of the invention may be replaced by any suitable type of reciprocating mechanism such as an electrical solenoid, a rack and pinion, or a pneumatic reciprocating mechanism. The discharger mechanism may be used in many different applications, e.g., for discharging piles of bark or chips in paper mills, rocks, resins, salt, sand, various types of sludges, and cooked or raw foods. In fact, the discharger mechanism may be used with almost any solid material that can be piled up on itself and is not damaged by the reciprocating motion of the discharge mechanism. Since the mechanism discharges the first material fed thereto, there is no opportunity for deterioration of the stored material in the pile.

The embodiments of the invention in which an exclusive property or privilege is claimed are defined as follows:

1. A discharger mechanism for discharging solid materials from the underside of a pile disposed on a support surface, said discharger mechanism comprising:
   a stoker rod extending beneath the pile,
   a plurality of stoker cross bars spaced apart along and rigidly attached to, said stoker rod,
   means for supporting said stoker rod within a trough formed on the support surface such that said cross bars contact the solid materials in the pile,
   reciprocating means for longitudinally reciprocating said stoker rod so that the cross bars cause movement of the solid materials, and
   means for holding down said rod and for sealing the trough against entry of solid materials from the pile, comprising:
      (i) a pair of longitudinally extending hold down members attached to opposite sides of said rod and extending along the length of said rod adjacent to its upper surface, and
      (ii) a pair of sealing members secured to opposite sides of said trough and extending inwardly therefrom to points above and adjacent to the upper edges of said pair of hold down members to provide sealing of the trough and to prevent materials from entering said trough.

2. The discharger mechanism of claim 1 wherein said hold down members comprise metal strips welded to opposite sides of said rod.

3. The discharger mechanism of claim 1 wherein said stoker rod is rectangular in cross section.

4. The discharger mechanism of claim 1 wherein said hold down members are fabricated of a material which is softer than that from which said sealing members are fabricated.

5. The discharger mechanism of claim 1 wherein said sealing members comprise metal plates.

6. A discharger mechanism for discharging solid materials from the underside of a pile disposed on the base of a bin or hopper, the base having at least one trough therein, said discharger mechanism comprising:
   a stoker rod disposed in said trough and extending beneath the pile, the outer perimeter of the cross-section of said rod being substantially rectangular in shape;
   a plurality of stoker cross bars substantially equispaced along said stoker rod and rigidly attached at the centers thereof to said stoker rod;
   for supporting said stoker rod in said trough, said support means including a support member having a shape conforming to the sides of the trough and including lateral, oppositely extending flanges, and a bearing member grouted into said support member and engaging the rod on the bottom and sides thereof;
   reciprocating means for longitudinally reciprocating said stoker rod; and
   hold down and sealing means for holding down said rod and for sealing said trough from the material in said pile, said hold down and sealing means comprising:
      (i) a pair of longitudinally extending bars attached to opposite sides of said rod and extending along the length of said rod adjacent to its upper surface, and
      (ii) a pair of seal members secured to the lateral flanges of said support member and extending inwardly into the trough from opposite sides thereof to points above and adjacent to the upper edges of said longitudinally extending bars to provide sealing of said trough and to prevent materials from entering said trough.

7. The discharge mechanism of claim 6 wherein said bars are fabricated of metal and are welded to opposite sides of said rod.

8. The discharger mechanism of claim 7 wherein said seal members comprise metal plates.

9. The discharger mechanism of claim 8 wherein bars are fabricated of a metal softer than the metal of said metal plates.

* * * * *